US009918066B2

(12) United States Patent
Schneider et al.

(10) Patent No.: US 9,918,066 B2
(45) Date of Patent: Mar. 13, 2018

(54) METHODS AND SYSTEMS FOR PRODUCING A MAGNIFIED 3D IMAGE

(71) Applicant: Elbit Systems Ltd., Haifa (IL)

(72) Inventors: Ron Schneider, Haifa (IL); Abraham Zeitouny, Haifa (IL)

(73) Assignee: Elbit Systems Ltd. (IL)

( * ) Notice: Subject to any disclaimer, the term of this patent is extended or adjusted under 35 U.S.C. 154(b) by 0 days.

(21) Appl. No.: 15/538,987

(22) PCT Filed: Dec. 21, 2015

(86) PCT No.: PCT/IL2015/051236
§ 371 (c)(1),
(2) Date: Jun. 22, 2017

(87) PCT Pub. No.: WO2016/103255
PCT Pub. Date: Jun. 30, 2016

(65) Prior Publication Data
US 2017/0359562 A1 Dec. 14, 2017

(30) Foreign Application Priority Data
Dec. 23, 2014 (IL) .......................................... 236420

(51) Int. Cl.
H04N 13/00 (2006.01)
G01B 11/245 (2006.01)
G06T 15/10 (2011.01)

(52) U.S. Cl.
CPC ....... H04N 13/0022 (2013.01); G01B 11/245 (2013.01); G06T 15/10 (2013.01); H04N 2013/0096 (2013.01)

(58) Field of Classification Search
CPC ........ H04N 13/0022; H04N 2013/0096; G06T 15/10
(Continued)

(56) References Cited

U.S. PATENT DOCUMENTS 6,111,597 A    8/2000 Tabata
6,389,153 B1   5/2002 Imai et al.
(Continued)

FOREIGN PATENT DOCUMENTS

DE   202010007397   8/2011
JP   2002354505     12/2002
JP   2003052058     2/2003

*Primary Examiner* — Jeffery Williams
(74) *Attorney, Agent, or Firm* — Vedder Price P.C.

(57) ABSTRACT

A method for producing a magnified three dimensional (3D) image of an object having a parallax modified according to the magnification including the procedures of acquiring a first image of the object by a first camera and a second image of the object by a second camera, determining a magnification parameter, generating a first magnified image and a second magnified image by respectively magnifying a portion of the first image containing the object and a portion of the second image containing the object according to the magnification parameter, modifying a geometry of the first magnified image and of the second magnified image as a function of the magnification parameter, thereby producing a first modified image and a second modified image, and displaying the magnified 3D image to a user by displaying the first modified image and the second modified image.

13 Claims, 4 Drawing Sheets

(58) Field of Classification Search
USPC .......................................................... 348/51
See application file for complete search history.

(56) References Cited

U.S. PATENT DOCUMENTS

| | | |
|---|---|---|
| 8,094,927 B2 | 1/2012 | Jin et al. |
| 2002/0118275 A1 | 8/2002 | Harman |
| 2004/0238732 A1 | 12/2004 | State et al. |
| 2008/0117289 A1 | 5/2008 | Schowengerdt et al. |
| 2011/0012998 A1 | 1/2011 | Pan |
| 2011/0075257 A1 | 3/2011 | Hua et al. |
| 2011/0234584 A1 | 9/2011 | Endo |
| 2012/0162775 A1 | 6/2012 | Francois et al. |
| 2013/0100253 A1 | 4/2013 | Sawachi |
| 2013/0120362 A1 | 5/2013 | Harris et al. |
| 2013/0128003 A1 | 5/2013 | Kishida et al. |
| 2013/0155198 A1 | 6/2013 | Nagano |
| 2013/0169633 A1* | 7/2013 | Hattori ............... H04N 13/0022 345/419 |

\* cited by examiner

METHODS AND SYSTEMS FOR PRODUCING A MAGNIFIED 3D IMAGE

FIELD OF THE DISCLOSED TECHNIQUE

The disclosed technique relates to magnification of stereoscopic images, in general, and to methods and systems for modifying magnified stereoscopic images according to the magnification for producing a magnified Three Dimensional (3D) image, in particular.

BACKGROUND OF THE DISCLOSED TECHNIQUE

Parallax is the apparent displacement, or the difference in apparent direction, of an object as seen from two different points (that are not positioned on a straight line with the object). Parallax provides visual cues for depth perception and is employed by the human brain for stereopsis. In particular, nearby objects exhibit a larger parallax than distant objects.

Inter Pupillary Distance (IPD) is the distance between the pupils of a system or of people. Different people have different IPD, and therefore may view the same object, from the same distance, at a slightly different parallax.

Reference is now made to US Patent Application Publication No. 2013/0100253 to Sawachi, and entitled "Image Processing Device, Imaging Capturing Device, and Method for Processing Image". This Publication relates to an image processing device including an image acquisition unit, a zoom value acquisition unit, a parallax amount calculation unit, and a parallax amount correction unit. The image acquisition unit acquires stereoscopic images. The zoom value acquisition unit acquires a zoom value of the stereoscopic images. The parallax amount calculation unit calculates a parallax amount of each pixel between the viewpoint images. The parallax amount calculation unit calculates a parallax amount correction value for correcting a parallax amount of each pixel of the stereoscopic images (e.g., a left eye image and a right eye image) according to the parallax amount calculated by the parallax amount calculation unit and according to the zoom value acquired by the zoom value acquisition unit.

Reference is now made to U.S. Pat. No. 8,094,927 issued to Jin et al., and entitled "Stereoscopic Display System with Flexible Rendering of Disparity Map According to The Stereoscopic Fusing Capability of The Observer". This Publication relates to a method for customizing scene content, according to a user, for a given stereoscopic display. The method includes the steps of obtaining customization information about the user, obtaining a scene disparity map, determining an aim disparity range for the user, generating a customized disparity map, and applying the customized disparity map. The customization information is respective a specific user and should be obtained for each user. The scene disparity map is obtained from a pair of given stereo images. The aim disparity range is determined from the customization information for the user. The customized disparity map is generated for correlating with the user's fusing capability of the given stereoscopic display. The customized disparity map is applied for rendering the stereo images for subsequent display.

Reference is now made to US Patent Application Publication No. 2004/0238732 to State et al., and entitled "Methods and Systems for Dynamic Virtual Convergence and Head Mountable Display". This Publication relates to a method for dynamic virtual convergence for video see through head mountable displays to allow stereoscopic viewing of close-range objects. The method includes the steps of sampling an image with a first and a second cameras, estimating a gaze distance for a viewer, transforming display frustums to converge at the estimated gaze distance, reprojecting the image sampled by the cameras into the display frustums, and displaying the reprojected image. Each camera having a first field of view. The reprojected image is displayed to the viewer on displays having a second field of view smaller than the first field of view (of the cameras), thereby allowing stereoscopic viewing of close range objects.

SUMMARY OF THE PRESENT DISCLOSED TECHNIQUE

It is an object of the disclosed technique to provide a novel method and system for producing a magnified Three Dimensional (3D) image of an object having a parallax modified according to the magnification. In accordance with an embodiment the disclosed technique, there is thus provided a method for producing a magnified 3D image of an object. The method includes the steps of acquiring images of the object, determining a magnification parameter, generating magnified images from the acquired images according to the magnification parameter, modifying the geometry of the magnified images as a function of the magnification parameter, and displaying the modified image as a 3D magnified image. The object parallax in the modified images is modified according to the magnification parameter.

In accordance with another embodiment the disclosed technique, there is thus provided a method for producing a magnified 3D image of an object. The method includes the steps of images of an object, producing a 3D model of said object, determining a magnification parameter, determining a magnified object distance, generating magnified images, and displaying the magnified images as a 3D magnified image. The object is positioned at an object distance from the cameras acquiring the images. The magnified object distance is a simulated distance of the object from the cameras, at which the object would be magnified according to the magnification parameter. The magnified object distance is determined according to the magnification parameter. The magnified images are generated from the from the 3D model. The magnified images contain the object as would appear from the magnified object distance.

In accordance with a further embodiment the disclosed technique, there is thus provided a system for producing a magnified 3D image of an object. The system includes cameras, a display, and an image processor. The cameras acquire images of an object located at an object distance from the cameras. The image processor generates magnified images of the object according to a magnification parameter. The object parallax in the magnified images is modified according to the magnification. The display displays the magnified images as a 3D image.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1A:
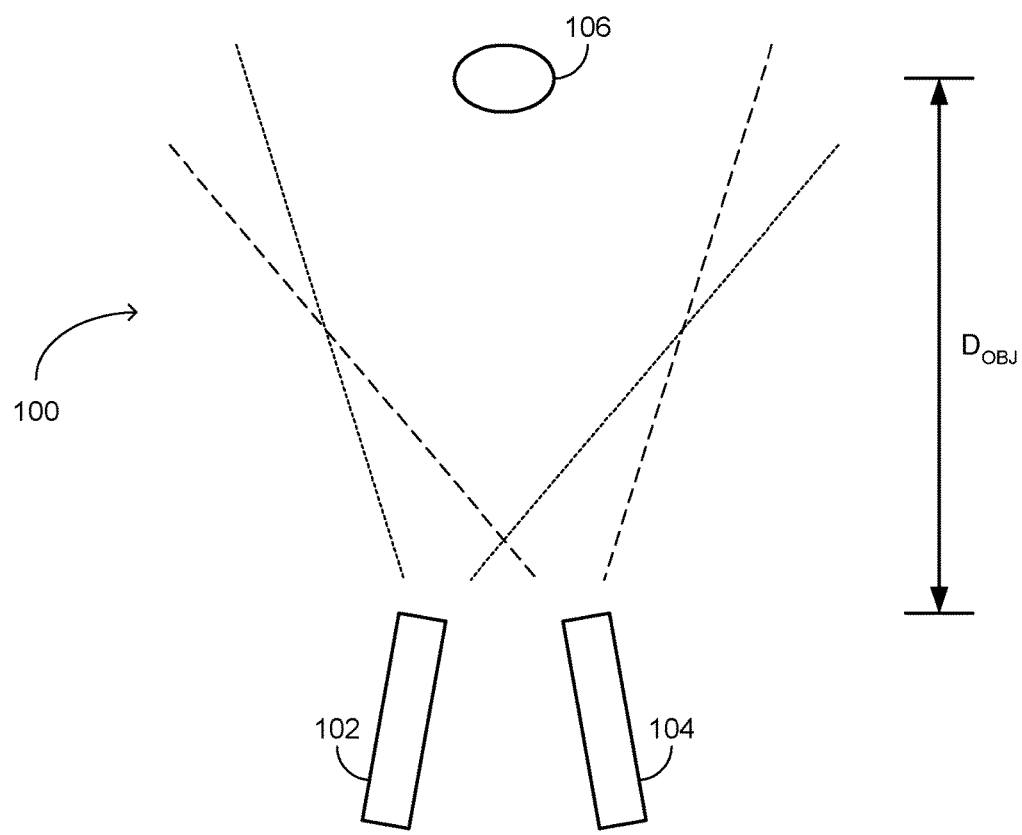
FIGS. 1A, 1B, 1C, 1D and 1E, are schematic illustrations of a system for producing magnified 3D images according to a magnification parameter for promoting stereopsis, constructed and operative in accordance with an embodiment of the disclosed technique.

The disclosed technique overcomes the disadvantages of the prior art by providing a method for producing magnified Three Dimensional (3D) images according to a magnification parameter. A left image and a right image are acquired by a spatially separated left camera and right camera (or by a single camera having two channels), respectively. Each of the left image and the right image contains an object. Due to the different perspectives of the left and the right cameras, the object appears differently in the left image and in the right image (e.g., appears in a different location within each image—parallax).

In a magnifying system, the image magnification causes an effect similar to the change of the point-of-view (i.e., the vantage point), where the scene is observed from a closer distance. Put another way, a magnified image simulates an image acquired at a shorter distance from the object. Thus, when the user wishes to view the object from a closer distance, the image of the object can be magnified. The user provides a magnification parameter and accordingly the image is magnified. That is, a portion of image containing the object is magnified. The image can be magnified by any manner known in the art (e.g., optically or digitally).

As the cameras are not moved during image magnification, their perspectives of the object remain unchanged. For example, the parallax of the object in the images remains unchanged. However, the magnified object gives the impression of shorter object distance. Therefore, the user viewing the magnified images receives contradicting visual cues, and may experience discomfort and suffer from fatigue, nausea, and the like. Thus, the geometry of the magnified images should be modified for producing a magnified 3D image that reduces user discomfort.

In accordance with one embodiment of the disclosed technique, the method for producing magnified 3D images involves receiving magnification parameter from the user indicating the desired magnification (or the desired point-of-view or object distance). The left and the right images are magnified, and in particular at least the portion containing the object is magnified.

The geometry of the magnified images are then modified. The geometrical modification is a function of the magnification parameter. Put another way, a geometrical modification function (i.e., a function of the magnification parameter) is applied onto the magnified images. For example, the geometry modification can be by way of displacement of the pixels of the magnified object, or by otherwise warping the image. The geometry of the magnified images is modified such that the object would appear as if imaged from a closer point-of-view (i.e., closer than the original location of the cameras). Put another way, the magnified images simulate images acquired at a shorter object distance (i.e. referred to herein as a magnified-object distance).

In case of modification by pixel displacement, the magnified portion of the images can be uniformly displaced (as a function of magnification). That is, the pixels are displaced linearly regardless of the pixel position, and depending only on the magnification. Meaning, the redefined image (after correction) is created by moving the entire pixels in the same amount in the vertical, horizontal or rotational axis. This uniform displacement is referred to herein as a zero-order modification, or a linear modification.

The modification can be of higher orders, such as a first-order modification, second-order modification, and so on. In each of the higher orders of modification (i.e., higher order than zero-order), the displacement of a displaced pixel depends on its original location within the image. Therefore, the higher order modifications may give better results for images having a substantial depth range.

In accordance with another embodiment of the disclosed technique, the method for producing magnified 3D images involves producing a Three Dimensional (3D) model of the object. The 3D model maps the depth of the elements of the object (and possibly of other objects in the images). After receiving the magnification parameter from the user, a magnified-object distance is determined. The magnified-object distance is the distance at which the object would appear as magnified as indicated by the magnification parameter. For example, the desired magnification is a magnification by a factor of two. The magnified-object distance is a distance of the object from the cameras, at which the object would appear as twice as large as in the original images.

Thereafter, a pair of magnified images is produced from the 3D model of the object. The magnified images simulate images that would have been acquired from the magnified-object distance. That is, the produced magnified images show the object as if imaged from the magnified-object distance (i.e., from the perspectives of the cameras in case the object was located at the magnified-object distance). Thereby, the produced magnified images show the object at the desired magnification and at the natural parallax, thereby promoting stereopsis. The produced magnified images form together a magnified 3D image.

Figure 1B:
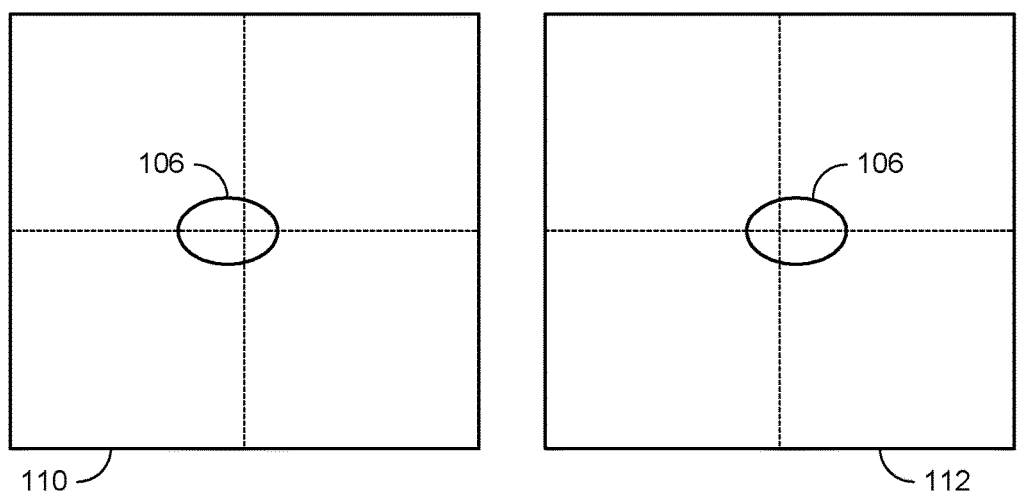
Figure 1C:
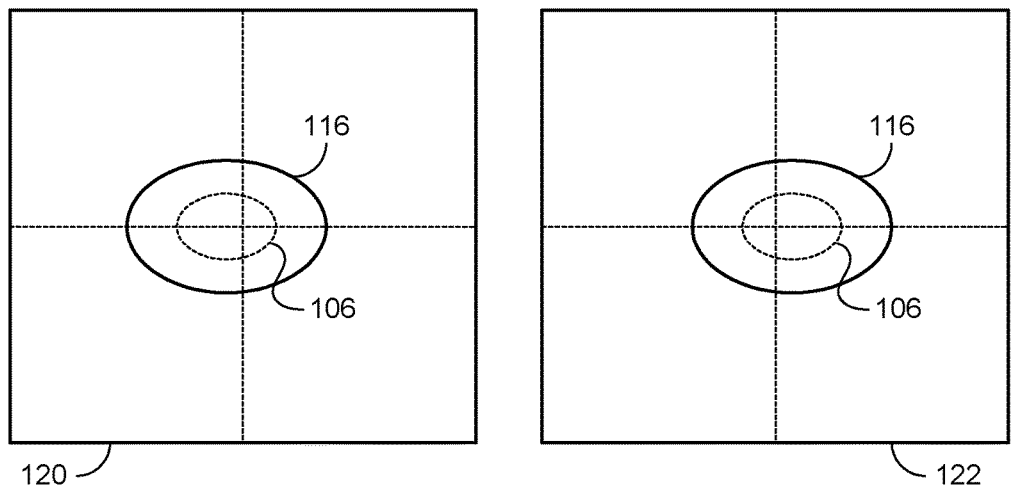
Figure 1D:
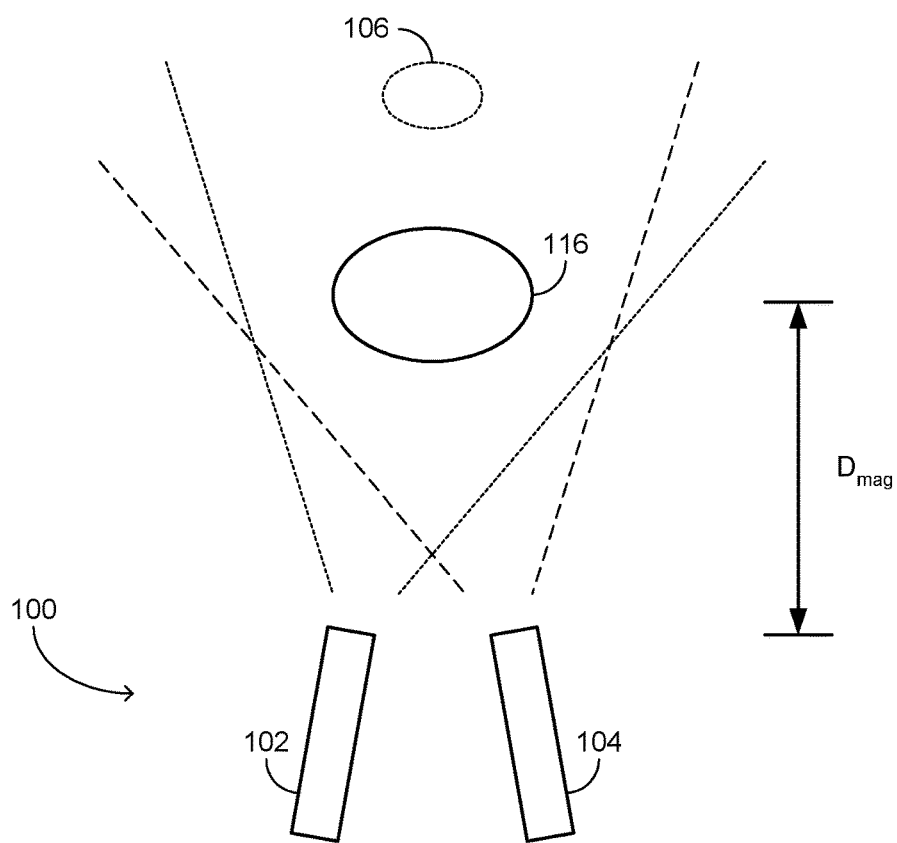
Figure 1E:
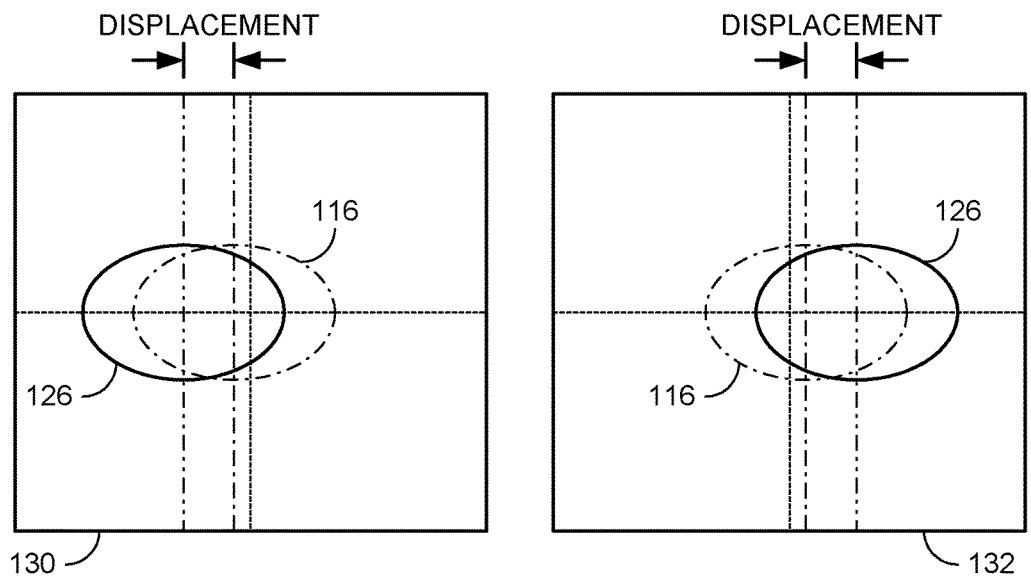

Reference is now made to FIGS. 1A, 1B, 1C, 1D and 1E, which are schematic illustrations of a magnified 3D image system, generally referenced 100, for producing magnified 3D images according to a magnification parameter, constructed and operative in accordance with an embodiment of the disclosed technique. FIG. 1A depicts the magnified 3D image system and an imaged object. FIG. 1B depicts a left and a right images acquired by the cameras of the magnified 3D image system. FIG. 1C depicts the magnified 3D image system and a representation of the magnified imaged object. FIG. 1D depicts a magnified left image and a magnified right image. FIG. 1E depicts a modified left image and a modified right image.

Magnified 3D image system 100 includes a first camera 102 (e.g., a left camera 102) and a second camera 104 (e.g., a right camera 104), each associated with a Field of View (FOV). In the example set forth in FIG. 1A, the FOV of camera 102 is indicated by two dotted lines, and the FOV of camera 104 is indicated by two dashed lines. Each of the cameras includes an image sensor and an optical assembly (both not shown). Each of cameras 102 and 104 is coupled with an image processor (e.g., image processor 206 of FIG. 2).

Each of cameras 102 and 104 acquires an image of an object 106 located at a distance $D_{obj}$ from the cameras. It is noted that the distance of object from camera 102 might be slightly different than from camera 104. However, these slight differences are negligible, and in particular are much smaller than the distance between camera 102 and camera 104 themselves. Therefore, herein below, $D_{obj}$ is related to as the distance between object 106 and camera 102, and as the distance between object 106 and camera 104 (or simply as the distance between the object and the cameras). The distance of the object from the cameras ($D_{obj}$) can also be described by the point-of-view of the cameras (e.g., the point-of-view corresponds to the object distance). For example, the point-of-view of the cameras is located 1.5 meters from the object, and thus the object distance is 1.5 meters.

As can be seen in FIG. 1A, each of cameras 102 and 104 acquires the respective image of the object from a slightly different perspective. As can be seen by the different location of object 106 within each of the FOVs of the cameras, object 106 would appear at a lightly different location within each of the images. That is, object 106 would exhibit a parallax between its location in the left image and its location in the right image.

With reference to FIG. 1B, a left image 110 and a right image 112 are presented. As can be seen, each of left image 110 and right image 112 contains object 106. Object 106 appears at a different location in each of the images (i.e., exhibiting a parallax). Specifically, in left image 110 the center of object 106 is located to the left of the center of the image, and in right image 112 the center of object 106 is located to the right of the center of the image. The parallax of object 106 in images 110 and 112 is defined by the location of each of cameras 102 and 104, and by the location of object 106 with respect to the cameras—$D_{obj}$.

Object 106 can be magnified. The magnification can either be optical or digital. Optical magnification employs optical elements (e.g., telescopic lens assembly or zoom lens assembly) for magnifying object 106 as seen by a user, detected by a camera, or displayed by a display. Digital magnification employs image processing techniques for cropping the magnified image portion and potentially extrapolating pixel values. When object 106 is magnified, it appears as if it is closer to the cameras. That is, the magnification of object 106 simulates a shorter object distance (i.e., a closer point-of-view of the cameras).

With reference to FIG. 1C, a left magnified image 120 and a right magnified image 122 depict a magnified object 116 (and its surroundings). As can be seen in FIG. 1C, magnified object 116 exhibits the same parallax in images 120 and 122 as object 106 in images 110 and 112. Put another way, the center of magnified object 116 in each of images 120 and 122 is in the same location as the center of object 106 in images 110 and 112. The parallax did not change with the object magnification, whether performed digitally or optically, as the object distance and cameras locations and orientations (i.e., the perspectives of the cameras) did not change.

It is noted however, that object magnification makes magnified object 116 to appear closer than object 106 (i.e., closer to cameras 102 and 104). With reference to FIG. 1D, magnified object 116 appears (according to its new magnified size) as if located at a magnified-object distance—$D_{mag}$—from the cameras, where $D_{mag}$ is smaller than $D_{obj}$. Put another way, the point-of-view of cameras 102 and 104 appears to be closer to magnified object 116 than to object 106.

Magnified images 120 and 122 provide contradicting visual depth cues to a viewer. On the one hand, the size of magnified object 116 indicates that the object is located at magnified-object distance $D_{mag}$, and on the other hand, the parallax of magnified object 116 in images 120 and 122 indicates that object 116 is located at object distance $D_{obj}$. Thereby, magnified images 120 and 122 may cause visual discomfort to the viewer. The disclosed technique adjusts the magnified images according to magnification to prevent such viewer discomfort.

With reference to FIG. 1E, a left adjusted image 130 and a right adjusted image 132 are depicted. Magnified object 116 is displaced in each of images 130 and 132 (with respect to images 120 and 122), in opposite directions, and is depicted as a displaced object 126. In particular, at least some of the pixels of images 120 and 122 are displaced.

In accordance with one embodiment of the disclosed technique, the magnified object is shifted, and the shift is determined as a function of the magnification. Specifically, all pixels are shifted uniformly regardless of the pixel position. Such a uniform shift is referred to herein as a zero-order modification. Thereby, the disclosed technique modifies the magnified images, such that the parallax of the magnified object corresponds to the magnified size of the object for promoting stereopsis.

An exemplary displacement function is given by [$D_{displacement}$=magnification*a (millimeters)], Where 'a' is a constant coefficient, such as 0.1. Thus, when magnifying the object by a magnification factor of 2, the displacement is 2 millimeters. Another exemplary displacement functions is given by [$D_{displacement}$=magnification*$a^2$+b (millimeter)], Where 'a' and 'b' are constant coefficients. Thus, for a=1.5 and b=3, when magnifying the selected scene by a magnification factor of two, the shift magnitude is 7.5 millimeters. Alternatively, the displacement can be related to the magnification by any other function. In this manner, the depth visual cues of images 130 and 132 are adjusted for promoting stereopsis (e.g., adjusted such that the size of magnified object 126 corresponds to the parallax of object 126 in the images).

In accordance with other embodiments of the disclosed technique, different pixels can be differently displaced. Specifically, the displacement of a pixel (or a set of pixels) is dependent on the position of the pixel, as well as on the magnification. Such non-uniform displacements are referred to herein as higher-order modifications (e.g., a first-order modification, a second-order modification, a third-order modification, and so forth). The higher order modifications may provide better results for magnified images having a substantial depth range.

An example of a first-order displacement is given by [$D_{displacement}$=aX+b]. An example of a second-order displacement is given by [$D_{displacement}$=a$X^2$+bX+c]. Another example of a second-order displacement is given by [$D_{displacement}$=aX+bY+c]. Wherein, 'X' is the pixel coordinate along the X-axis, 'Y' is the pixel coordinate along the Y-axis, and 'a', 'b' and 'c' are coefficients. It is noted that at least one of the coefficients is dependent on the object magnification. An example of a first-order modification is given by [$D_{displacement}$=f(magnification)*X+g(magnification)], wherein 'f' and 'g' are functions of the magnification.

In accordance with other embodiments of the disclosed technique, the geometric modification of the magnified images, involves other methods of warping the magnified images. For example, the images (or different portions of the images) can be stretched, contracted, rotated, and any combination thereof. The geometric modifications are a function of the magnification parameter, and are directed at modifying the images, such that the magnified object would appear as if imaged from the magnified-object distance.

In accordance with yet another embodiment, other modifications besides geometric modifications are also applied on the magnified images. For example, modification of pixel values for modifying hues and colors, or modifying the shading.

In accordance with yet another embodiment of the disclosed technique, the image modification system generates magnified (and modified) images, instead of modifying already magnified images. The image modification system receives the desired magnification from the user. The image modification system produces a Three Dimensional (3D) model of the object from the left and the right images. The 3D model of the scene can be created, for example, from knowledge of the actual point-of-view of the cameras (with respect to the object), the relative position of the cameras, and correlation between the images from the two cameras. That is, the image modification system maps the depth of the different elements of the object. The image modification system generates the adjusted images as if acquired from the magnified-object distance from the 3D model. This embodiment is detailed further herein below, with reference to FIG. 4.

Alternatively, the 3D model can be produced from additional or alternative data, such as data received from an external source (e.g., another imaging or scanning device, structured light, time of flight, etc.), data from previously acquired images of the object, and the like. It is noted that in case such additional 3D data is received, the 3D model can be produced from a single image acquired by a single camera. Alternatively, the complete 3D model is received from an external source and there is no need to produce the model from images of the cameras.

In the examples set forth in FIGS. 1A-1E, the object was magnified to appear larger. However, the disclosed technique can similarly be applied for a minified object (i.e., minification instead of magnification), in which case the object is made to appear smaller. In such a case, the object parallax is adjusted such that the parallax is reduced so as to correspond to the reduced size of the object (i.e., that appears more distant).

Figure 2:
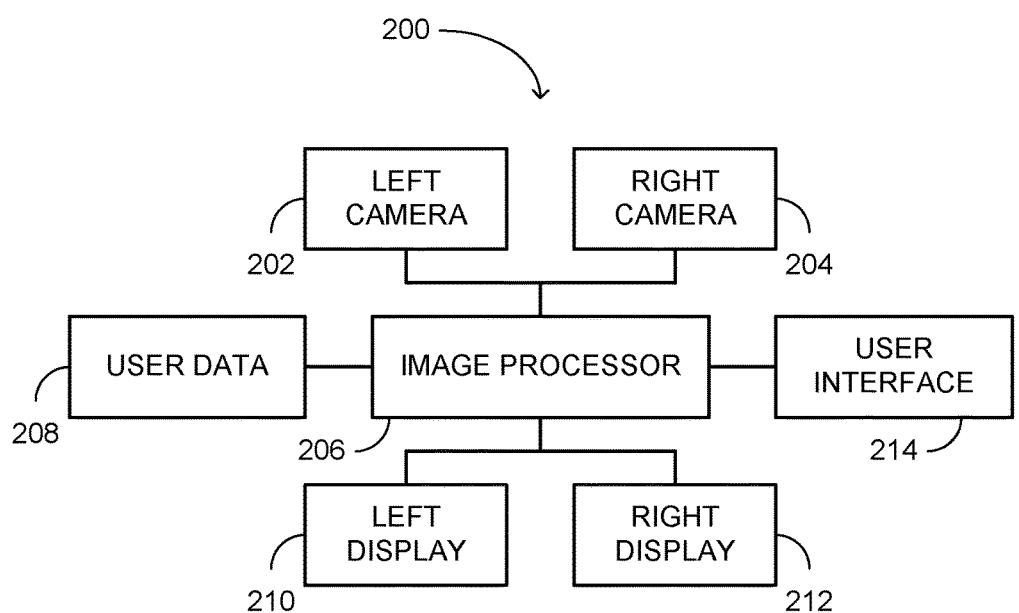
FIG. 2 is a schematic illustration of a system for producing magnified 3D images according to a magnification parameter for promoting stereopsis, constructed and operative in accordance with another embodiment of the disclosed technique.

Reference is now made to FIG. 2, which is a schematic illustration of a system, generally referenced 200, for producing magnified 3D images according to a magnification parameter for promoting stereopsis, constructed and operative in accordance with another embodiment of the disclosed technique. System 200 includes a left camera 202, a right camera 204, an image processor 206, a user-data interface 208, a left display 210 a right display 212, and a user interface 214. Each of cameras 202 and 204 is coupled with image processor 206. Image processor is further coupled with user-data interface 208 and with each of left display 210 and right display 212, and with user interface 214.

Each of cameras 202 and 204 is substantially similar to cameras 102 and 104 of FIG. 1A, and is similarly positioned. Image processor 206 can be implemented by any computer system. For example, the computer system can include a processing unit (or several processing units), system memory (e.g., Random Access Memory and Read Only Memory), a mass storage device (e.g., a hard drive), Input/Output devices (e.g., a keyboard, a mouse, a screen, and a speaker), and a communication interfaces (e.g., a modem). These components are coupled therebetween by a system bus (or buses). Each of these components is structured and operated as known in the art, and therefore are not further elaborated herein. Processor 206 controls each of the components of image modification system 200, and additionally modifies the magnified images. For example, processor 206 controls cameras 202 and 204, receives data from user-data interface 208 and from user interface 214, and renders images for display 210 and 212.

User-data interface 208 is an interface for providing user data to processor 206. The user data relates to the visual characteristics of the user, such as the user Inter-Pupillary Distance (IPD). The user data can be determined by user-data interface 208 itself, or can be retrieved from an external source. For example, for determining the IPD of a user, user-data interface 208 can include an IPD measurement tool, or can access a medical database containing the IPD measurements of a selected user. Left display 210 and right display 212 are visual output interfaces for presenting images to the user. User interface 214 allows system 200 to receive input from a user. For example, the user can indicate desired magnification level via a zoom knob, or via a keypad interface.

Each of left and right cameras 202 and 204 acquires a respective image. Each of the acquired images contains an object. Image processor 206 receives the acquired images and presents the images to the user via displays 210 and 212. It is noted that the left and right cameras (also referred to herein as a first and a second camera), can be replaced by a single camera having two channels. Thus any reference herein to a first camera and a second camera, is also referred to a single dual-channel camera. The single camera can have two separate image sensors, or a single image sensor having dedicated portions for detecting each of the images.

Image processor 206 determines a magnification parameter for magnifying the images. For example, image processor 206 receives the magnification parameter from the user. The user provides the magnification parameter via user interface 214. For example, the user indicates that she wants to view the object magnified by a selected factor, or that she wants to view from a closer point-of-view, and accordingly wants to zoom into the images by a selected magnitude.

In accordance with one embodiment of the disclosed technique, image processor 206 produces magnified images of the originally acquired images according to the magnification parameter. For example, image processor 206 operates cameras 202 and 204 to acquire a magnified image by changing the focal length of cameras 202 and 204. Alternatively, image processor digitally magnifies a selected portion of the acquired images (i.e., magnifies the object). It is noted that the magnification of the object can relate an increase in the appearance of the scene, or a decrease (i.e., minification).

Image processor 206 can retrieves user data, such as the user IPD, from user-data interface 208. Image processor 206 modifies the magnified images according to the magnification, and possibly further according to the user data. Image processor 206 generates modified magnified images and displays them via left and right displays 210 and 212, as a magnified 3D image. Put another way, image processor 206 generates the modified magnified images according to the magnification parameter, such that a location of the object within the modified magnified images corresponds to a magnification of the object. Put another way, the parallax of the magnified object in the modified images is modified according to the magnification (i.e., as a function of the magnification parameter), such that the modified parallax corresponds to the magnification.

In accordance with another embodiment of the disclosed technique, image processor 206 generates the modified magnified images instead of modifying the magnified images. Image processor 206 produces a 3D model of the object from the left and the right images, mapping the depth of the different elements of the object. Image processor 206 receives the magnification parameter of the user from user interface 214. Image processor 206 determines a magnified-object distance simulated by the desired magnification. Image processor 206 generates modified magnified images from the 3D model of the object. The modified images are magnified images of the object as would have been acquired in case the object was located at the magnified-object distance from cameras 202 and 204 (i.e., in case the cameras were positioned in the simulated point-of-view simulated by the magnification).

In accordance with yet another embodiment of the disclosed technique, the object can be adjusted according to user data (besides according to the magnification). For example, the user IPD can affect the adjusted parallax of the object in the magnified images. Different users have different IPDs and therefore may perceive the same object, from the same distance, at a different parallax. The modified parallax of the magnified object in the magnified images can be modified to the specific IPD of the specific user, such that the depth perception of the magnified object according to its size would correspond to the depth perception of the magnified object according to the modified parallax in the images.

In the examples set forth herein above with reference to FIGS. 1A-1E and 2, the image modification systems have two cameras. Alternatively, higher number of cameras can be employed for acquiring images of the object from higher number of perspectives. The magnified images are adjusted such that the object would appear as if the images were acquired at the magnified-object distance.

Figure 3:
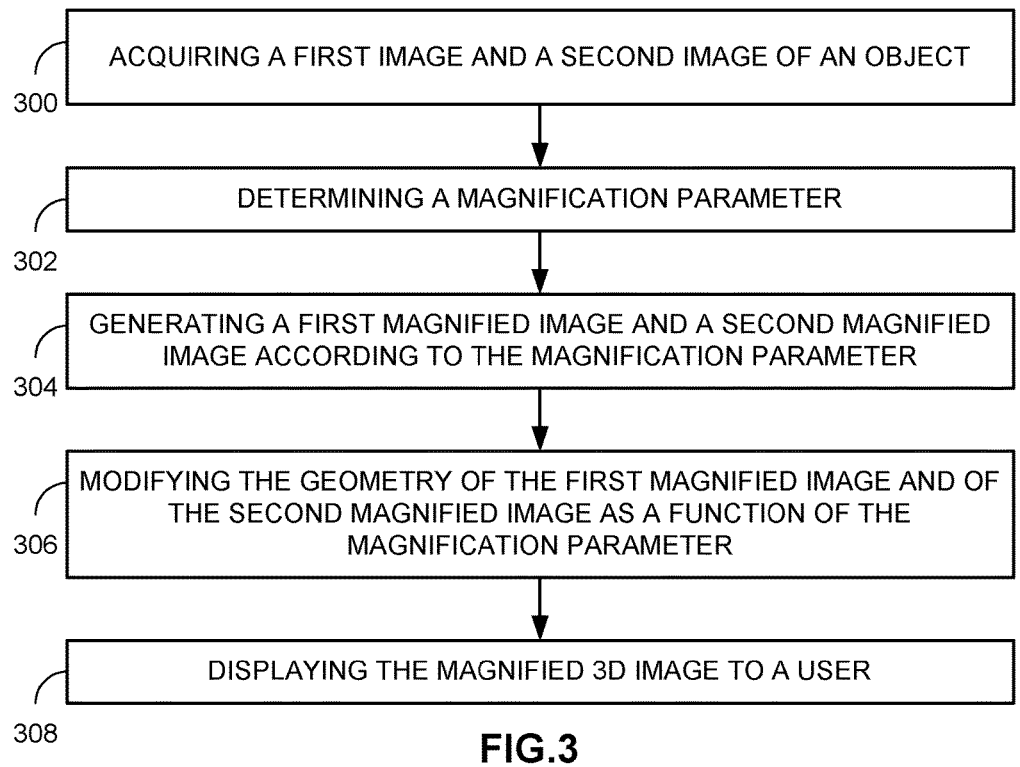
FIG. 3 is a schematic illustration of a method for producing magnified 3D images according to a magnification parameter for promoting stereopsis, operative in accordance with a further embodiment of the disclosed technique.

Reference is now made to FIG. 3, which is a schematic illustration of a method for producing magnified 3D images according to a magnification parameter for promoting stereopsis, operative in accordance with a further embodiment of the disclosed technique. In procedure 300, a first image and a second image of an object are acquired. The first image is acquired by a first camera, and the second image is acquired by a second camera. The position of the object in the first image and in the second image exhibits a parallax due to the different camera positions. It is noted that the first and the second cameras can be replaced by a single dual-channel camera. With reference to FIGS. 1A and 1B, cameras 102 and 104 acquired images 110 and 112, respectively. Each of images 110 and 112 contains object 106.

In procedure 302, a magnification parameter is determined. The user views the acquired images via image displays. When the user wishes to have a closer view of the object, the user provides a magnification parameter. The magnification parameter is provided by a user via a user interface. For example, the user operates a zoom in/out knob (and accordingly the magnification parameter is determined), or provides the magnification output via a keypad. The magnification parameter indicates a desired magnification. Image magnification simulates a change in the point-of-view, or the object distance (i.e., a change in the distance between the camera and the imaged scene). With reference to FIG. 2, the user provides a magnification parameter via user interface 214.

Additionally, user data can also be received. The user data can either be determined, or retrieved from an external source. The user data can relate to the IPD of the user, and to sight characteristics of the user, such as her view angle, and the like. With reference to FIG. 2, user-data interface 208 determines user data, such as the user IPD, and provides the user data to image processor 206.

In procedure 304, a first magnified image and a second magnified image are generated. The first magnified image is generated by magnifying a portion of the first image, containing the object, according to (i.e., as a function of) the magnification parameter. The second magnified image is generated by magnifying a portion of the second image, containing the object, according to the magnification parameter. The object can either be optically or digitally magnified. The magnification does not change the location or proportions of the object in the images.

After magnification the magnified object appears to be closer to the cameras (due to its magnified size). However, the proportions and location of the object in each of the magnified images (e.g., the parallax of the object in the magnified images), does not indicate a change in the object distance, or a change in the point-of-view of the cameras. Therefore, the magnified images provide contradicting depth visual cues, which may cause discomfort to the user. With reference to FIGS. 1C and 1D, magnified images 120 and 122 depict magnified object 116. Due to its magnified size, magnified object 116 appears to be located at a distance $D_{mag}$ from the cameras, which is closed than the actual distance $D_{obj}$.

In procedure 306, a geometry of the first magnified image and of the second magnified image is modified, as a function of the magnification parameter. Thereby, a first modified image and a second modified image are produced. The parallax of the magnified object in the modified images is modified according to the magnification parameter. In this manner, the parallax of the magnified object corresponds to the magnification of the magnified object, thus reducing viewer discomfort and promoting stereopsis.

The geometric modification can be performed by displacing the pixels of the object in each of the magnified images, in opposite directions, at a displacement determined according to the magnification parameter. Thereby, for example, the modified parallax corresponds to the magnification, and the viewer experiences no stereopsis discomfort when viewing the modified images. Additionally, the displacement can be further determined according to the user data, such as the user IPD, such that the adjusted images are tailored specifically for the user thereby further decreasing user discomfort.

The pixels of the magnified object can be displaced together in the same manner. Alternatively, a respective displacement is determined for each pixel or set of pixels. The displacement can be determined according to the pixel location within the image. For example, the displacement is a linear function of the X coordinate of the pixel, or a quadratic function of both the X and Y coordinates of the pixel. In this manner, the object is not only shifted but also warped. Warping of the magnified object provides better compensation for images having a substantial depth range. In this manner, the modified images containing the modified magnified object appear as if acquired from the magnified-object distance simulated by the desired magnification. Generally, any image geometric, or otherwise, modification can be employed for modifying the magnified images to appear as if acquired from the magnified-object distance (closer than the actual object distance). The modified images form together a magnified 3D image, allowing the user 3D view of the magnified object.

In accordance with another embodiment of the disclosed technique, the displacement of each pixel relates to the relative object distance of the element represented by that pixel. For example, in case the object is a group of objects, each located at a different distance from the cameras. The displacement of pixels depicting a first object located at a shorter distance would be greater than the displacement of pixels depicting a second object located at a longer distance. Thereby, the parallax of each object is adjusted according to the specific object distance of that object.

Additionally, the images can be modified (e.g., by displacing pixels) to accommodate for specific user characteristic, such as user IPD. That is, the images are adjusted such that they appear as a specific user, having a specific IPD, was viewing the object from the simulated point-of-view.

With reference to FIGS. 2 and 1E, image processor 206 displaces the pixels of the magnified selected scene according to the magnification (and possibly according to user data) for allowing for convenient stereopsis. The displacement is directed at geometrically modifying the magnified images to appear as if acquired when the object is located at the magnified-object distance, simulated by the image magnification. Image processor 206 produces images 130 and 132 in which adjusted object 126 is shifted from the location of magnified object 116, thereby geometrically modifying images 130 and 132 for promoting stereopsis.

With reference to procedure 308, the magnified 3D image is displayed to a user. The magnified modified images form together the magnified 3D image. The first modified image is displayed to a first eye of the user, and the second modified image is displayed to a second eye of the user. Thereby, the magnified 3D image is displayed to the user. The modified images, promote stereopsis and the user views a magnified 3D image of the object. With reference to FIGS. 2 and 1E, first display 210 displays first modified image 130 and second display 212 displays second modified image 132.

Figure 4:
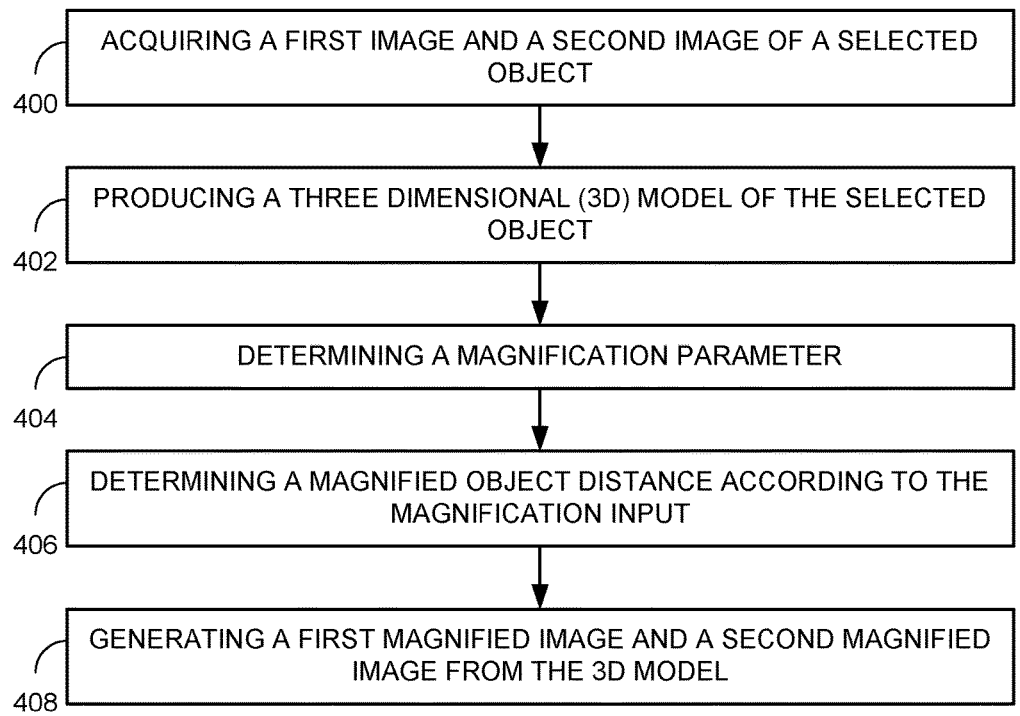
FIG. 4 is a schematic illustration of a method for producing magnified 3D images according to a magnification parameter for promoting stereopsis, operative in accordance with a yet another embodiment of the disclosed technique.

Reference is now mage to FIG. 4, which is a schematic illustration of a method for producing magnified 3D images according to a magnification parameter for promoting stereopsis, operative in accordance with yet another embodiment of the disclosed technique. In procedure 400, a first image and a second image of an object are acquired. The first image is acquired by a first camera, and the second image is acquired by a second camera. The position of the object in the first image and in the second image exhibits a parallax due to the different camera positions. With reference to FIGS. 1A and 1B, cameras 102 and 104 acquired images 110 and 112, respectively. Each of images 110 and 112 contains object 106.

In procedure 402, a Three Dimensional (3D) model of the object is produced from the first and the second images. The 3D model maps the depth of each element of the object. The 3D model is created, for example, from knowledge of the actual point-of-view of the cameras, the relative position of the cameras, and correlation between the images from the two cameras. Alternatively, the 3D model can be produced from additional or alternative data, such as data received from an external source, data from previously acquired images of the object, and the like. In such cases, the 3D model can be produced from only a single image, or can be completely produced from additional data without the images. With reference to FIG. 2, image processor 206 produces the 3D model of the selected scene from the left image and the right image.

In procedure 404, a magnification parameter is determined. Procedure 404 is similar to procedure 302 of FIG. 3, and can similarly include the step of receiving user data, such as user IPD. With reference to FIG. 2, the user provides a magnification parameter via user interface 214.

In procedure 406, a magnified-object distance is determined according to the magnification parameter. The magnified-object distance is a simulated distance of the object from the cameras, at which the object would be magnified according to the magnification parameter. For example, in case the desired magnification is by a factor of two, the magnified-object distance, is the distance at which the object would appear as twice as large as in the originally acquired images. With reference to FIGS. 1D and 2, image processor 206 determines the magnified-object distance $D_{mag}$ images according to the magnification parameter.

In procedure 408, a first magnified image and a second magnified image are generated from the 3D model. Each of the first magnified image and the second magnified image contains the object as would appear from the magnified-object distance. As mentioned above, image magnification simulates a shorter object distance. However, the magnified image is different from an image acquired at a shorter distance because the perspective of the camera does not change by the magnification. The magnified modified images are generated to simulate to closer point-of-view that corresponds to the magnification. The magnified modified images are generated from the 3D model of the object. The magnified modified images, form together a magnified 3D image of the object.

The magnified-object distance (or the simulated point-of-view) is determined according to the magnification parameter. For example, the distance is inversely proportional to the magnification. That is, a magnification by a factor of two, is translated into an object distance which is half of the original object distance. Other relations between the magnification and the distance can be employed. In accordance with one embodiment of the disclosed technique, an empiric table is produced for the cameras. That is, the cameras are positioned at different distances from an object, and the object magnification at each distance is stored at a Look-Up-Table. As mentioned above, the modified images can be tailored for a specific user having specific sight characteristics, such as IPD.

In accordance with another embodiment of the disclosed technique, the images include a plurality of objects (or in case the object includes a plurality of elements), each positioned at a different distance from the cameras. In this case, a magnified-object distance can be determined for each of the objects (or for each element of the object). The magnified images are generated such that each object appears as if imaged from the respective magnified-object distance for producing a 3D image that promotes stereopsis.

With reference to FIGS. 1E and 2, image processor 206 generates images 130 and 132, at which object 126 appears as if imaged from magnified-object distance $D_{mag}$. Image processor 206 presents images 130 and 132 to the user via displays 210 and 212 as a magnified 3D image.

It will be appreciated by persons skilled in the art that the disclosed technique is not limited to what has been particularly shown and described hereinabove. Rather the scope of the disclosed technique is defined only by the claims, which follow.

The invention claimed is:

1. A method for producing a magnified Three Dimensional (3D) image of an object having a parallax modified according to the magnification, the method comprising the following procedures:

acquiring a first image of said object by a first camera and acquiring a second image of said object by a second camera;

determining a magnification parameter;

generating a first magnified image by magnifying a portion of said first image containing said object according to said magnification parameter, and generating a second magnified image by magnifying a portion of said second image containing said object according to said magnification parameter, wherein a parallax of said object in said first and second magnified images is the same as a parallax of said object in said first and second images;

modifying a geometry of said first magnified image and of said second magnified image as a function of said magnification parameter, thereby producing a first modified image and a second modified image, wherein said object has a modified parallax in said first modified image and in said second modified image, wherein a magnification-simulated object distance simulated by first and second magnified images corresponds to said modified parallax; and displaying said magnified 3D image to a user by displaying said first modified image and said second modified image.

2. The method of claim 1, wherein said procedure of modifying the geometry is performed by displacing at least one pixel of said selected object.

3. The method of claim 2, wherein a displacement of everyone of said at least one pixel is the same.

4. The method of claim 2, wherein a displacement of a selected one of said at least one pixel is dependent on a location of said selected one of said at least one pixel.

5. The method of claim 1, further comprising the procedure of receiving user data characterizing a selected user, and wherein said procedure of modifying the geometry is being performed further according to said user data.

6. A method for producing a magnified Three Dimensional (3D) image having a parallax modified according to the magnification, the method comprising the following procedures:

acquiring a first image of an object by a first camera and acquiring a second image of said object by a second camera, said object being located at an object distance from said first camera and said second camera;

producing a 3D model of said object;

determining a magnification parameter;

determining a magnification-simulated object distance according to said magnification parameter, wherein said magnification-simulated object distance being a simulated distance of said object from said first camera and said second camera, at which said object would be magnified according to said magnification parameter;

generating a first magnified image and a second magnified image from said 3D model, each of said first magnified image and said second magnified image containing said object as would appear from said magnification-simulated object distance, wherein said magnification-simulated object distance simulated by said first and second magnified images corresponds to a modified parallax in said first and second magnified images; and displaying said magnified 3D image to a user by displaying said first magnified image and said second magnified image.

7. The method of claim 6, further comprising the procedure of receiving user data characterizing a selected user, and wherein said procedure of generating said first magnified image and said second magnified image from said 3D model is being performed further according to said user data.

8. The method of claim 6, wherein said 3D model is produced from said first image and said second image.

9. The method of claim 6, wherein said 3D model is produced from said first image and from 3D object data received from an external source.

10. A system for producing a magnified 3D image having a parallax modified according to the magnification, the system comprising:

a first camera configured to acquire a first image of an object being located at an object distance from said first camera;

a second camera configured to acquire a second image of said object being located at said object distance from said second camera;

a first display configured to display a first magnified image to a user;

a second display configured to display a second magnified image to said user;

an image processor coupled with said first camera, said second camera, said first display and said second display, said image processor configured to generate said first magnified image and said second magnified image according to a magnification parameter, said object having a magnification-simulated object distance and a modified parallax in said first magnified image and in said second magnified image, said magnification-simulated object distance being a simulated distance of said object from said first camera and said second camera in said first and second magnified images, wherein said magnification-simulated object distance corresponds to said modified parallax.

11. The system of claim 10, wherein said image processor is configured to generate said first magnified image by magnifying a portion of said first image containing said object according to said magnification parameter, and to generate said second magnified image by magnifying a portion of said second image containing said object according to said magnification parameter, said image processor being further configured to modify a geometry of said first magnified image and of said second magnified image, as a function of said magnification parameter.

12. The system of claim 10, wherein said image processor is configured to produce a 3D model of said object, said image processor being further configured to determine a magnified-object distance according to said magnification parameter, said magnified-object distance being a simulated distance of said object from said first camera and said second camera, at which said object would be magnified according to said magnification parameter, and wherein said image processor is configured to generate said first magnified image and said second magnified image from said 3D model, each of said first magnified image and said second magnified image containing said object as would appear from said magnified-object distance.

13. The system of claim 10, further comprising a user-data interface configured to receive user data characterizing a selected user, and wherein said image processor is further configured to generate said first magnified image and said second magnified image further according to said user data.

* * * * *